(12) United States Patent
Gutman et al.

(10) Patent No.: US 12,445,241 B2
(45) Date of Patent: Oct. 14, 2025

(54) RECEPTION INTERFERENCE INDICATION

(71) Applicant: QUALCOMM Incorporated, San Diego, CA (US)

(72) Inventors: Igor Gutman, Hod HaSharon (IL); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 295 days.

(21) Appl. No.: 17/655,680

(22) Filed: Mar. 21, 2022

(65) Prior Publication Data

US 2023/0318765 A1 Oct. 5, 2023

(51) Int. Cl.
*H04L 5/00* (2006.01)
*H04W 72/0453* (2023.01)
*H04W 72/54* (2023.01)

(52) U.S. Cl.
CPC .......... *H04L 5/0046* (2013.01); *H04L 5/0073* (2013.01); *H04W 72/0453* (2013.01); *H04W 72/54* (2023.01)

(58) Field of Classification Search
CPC ... H04L 5/0046; H04L 5/0073; H04L 5/0062; H04L 5/0094; H04W 72/0453; H04W 72/54; H04W 72/541
See application file for complete search history.

(56) References Cited

U.S. PATENT DOCUMENTS

| | | | |
|---|---|---|---|
| 2013/0322260 A1* | 12/2013 | Yao | H04W 24/10 370/241 |
| 2016/0366697 A1* | 12/2016 | Andersson | H04W 72/1268 |
| 2018/0109995 A1* | 4/2018 | Akkarakaran | H04L 5/0053 |
| 2020/0014569 A1* | 1/2020 | Huang | H04W 8/24 |
| 2022/0060215 A1* | 2/2022 | Nakamura | H04W 72/21 |

* cited by examiner

*Primary Examiner* — Khoa Huynh
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a node, a list of frequency allocations that are associated with interference at the UE. The UE may communicate in accordance with the list of frequency allocations. Numerous other aspects are described.

26 Claims, 9 Drawing Sheets

RECEPTION INTERFERENCE INDICATION

FIELD OF THE DISCLOSURE

Aspects of the present disclosure generally relate to wireless communication and to techniques and apparatuses for reception interference indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include transmitting, to a node, a list of frequency allocations that are associated with interference at the UE. The method may include communicating in accordance with the list of frequency allocations.

Some aspects described herein relate to a method of wireless communication performed by an apparatus of a node. The method may include receiving, from a UE, a list of frequency allocations that are associated with interference at the UE. The method may include communicating in accordance with the list of frequency allocations.

Some aspects described herein relate to an apparatus for wireless communication at a UE. The apparatus may include a memory and one or more processors coupled to the memory. The one or more processors may be configured to transmit, to a node, a list of frequency allocations that are associated with interference at the UE. The one or more processors may be configured to communicate in accordance with the list of frequency allocations.

Some aspects described herein relate to an apparatus for wireless communication at a node. The apparatus may include a memory and one or more processors coupled to the memory. The one or more processors may be configured to receive, from a UE, a list of frequency allocations that are associated with interference at the UE. The one or more processors may be configured to communicate in accordance with the list of frequency allocations.

Some aspects described herein relate to a non-transitory computer-readable medium that stores a set of instructions for wireless communication by a UE. The set of instructions, when executed by one or more processors of the UE, may cause the UE to transmit, to a node, a list of frequency allocations that are associated with interference at the UE. The set of instructions, when executed by one or more processors of the UE, may cause the UE to communicate in accordance with the list of frequency allocations.

Some aspects described herein relate to a non-transitory computer-readable medium that stores a set of instructions for wireless communication by a node. The set of instructions, when executed by one or more processors of the node, may cause the node to receive, from a UE, a list of frequency allocations that are associated with interference at the UE. The set of instructions, when executed by one or more processors of the node, may cause the node to communicate in accordance with the list of frequency allocations.

Some aspects described herein relate to an apparatus for wireless communication. The apparatus may include means for transmitting, to a node, a list of frequency allocations that are associated with interference at the apparatus. The apparatus may include means for communicating in accordance with the list of frequency allocations.

Some aspects described herein relate to an apparatus for wireless communication. The apparatus may include means for receiving, from a UE, a list of frequency allocations that are associated with interference at the UE. The apparatus may include means for communicating in accordance with the list of frequency allocations.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
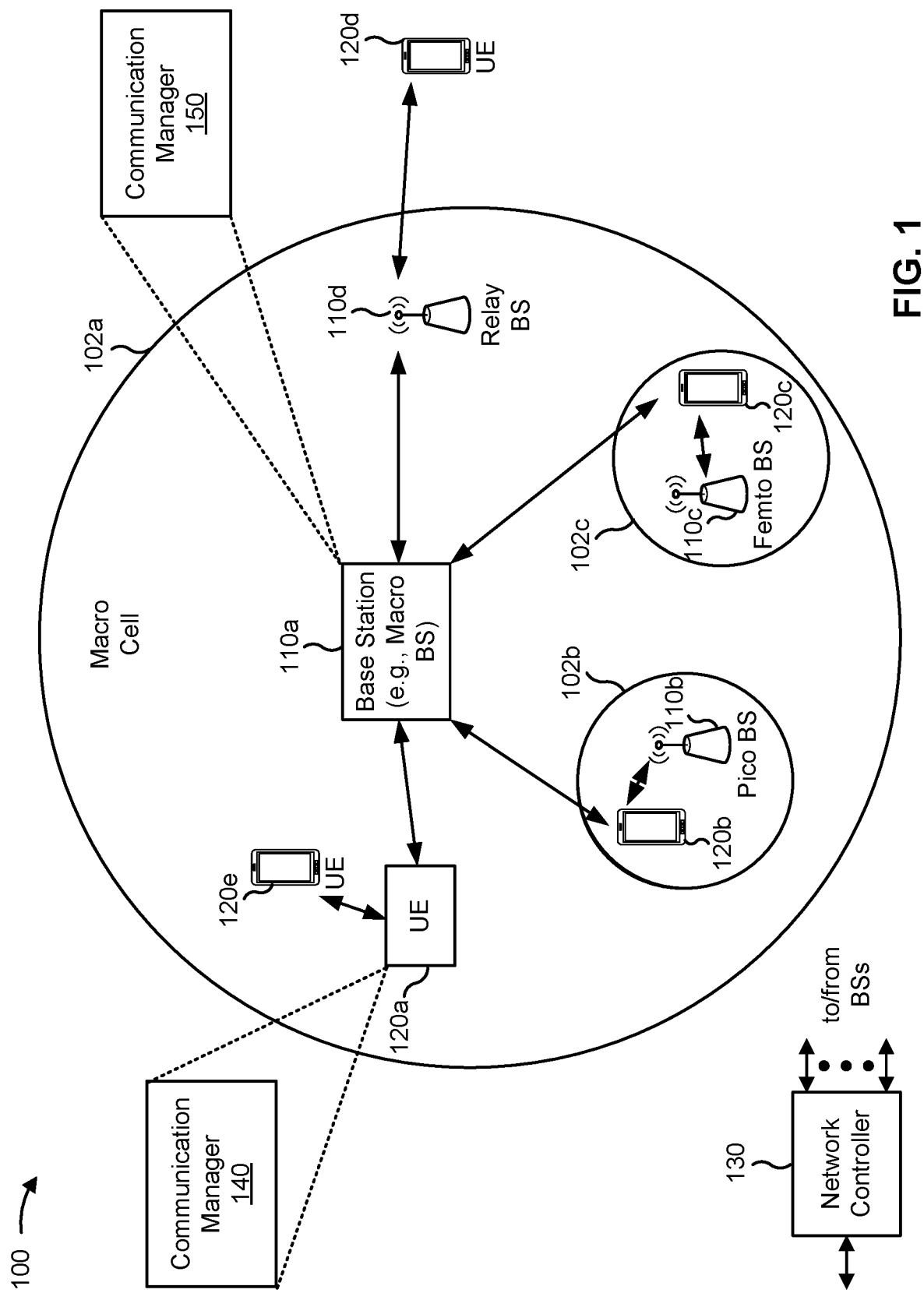
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a node, a list of frequency allocations that are associated with interference at the UE; and communicate in accordance with the list of frequency allocations. Additionally, or alternatively, the communication manager 140 may perform one or more other operations described herein.

In some aspects, a node (e.g., the base station 110) may include a communication manager 150. As described in more detail elsewhere herein, the communication manager 150 may receive, from a UE, a list of frequency allocations that are associated with interference at the UE; and communicate in accordance with the list of frequency allocations. Additionally, or alternatively, the communication manager 150 may perform one or more other operations described herein.

As indicated above, FIG. 1 is provided as an example. Other examples may differ from what is described with regard to FIG. 1.

Figure 2:
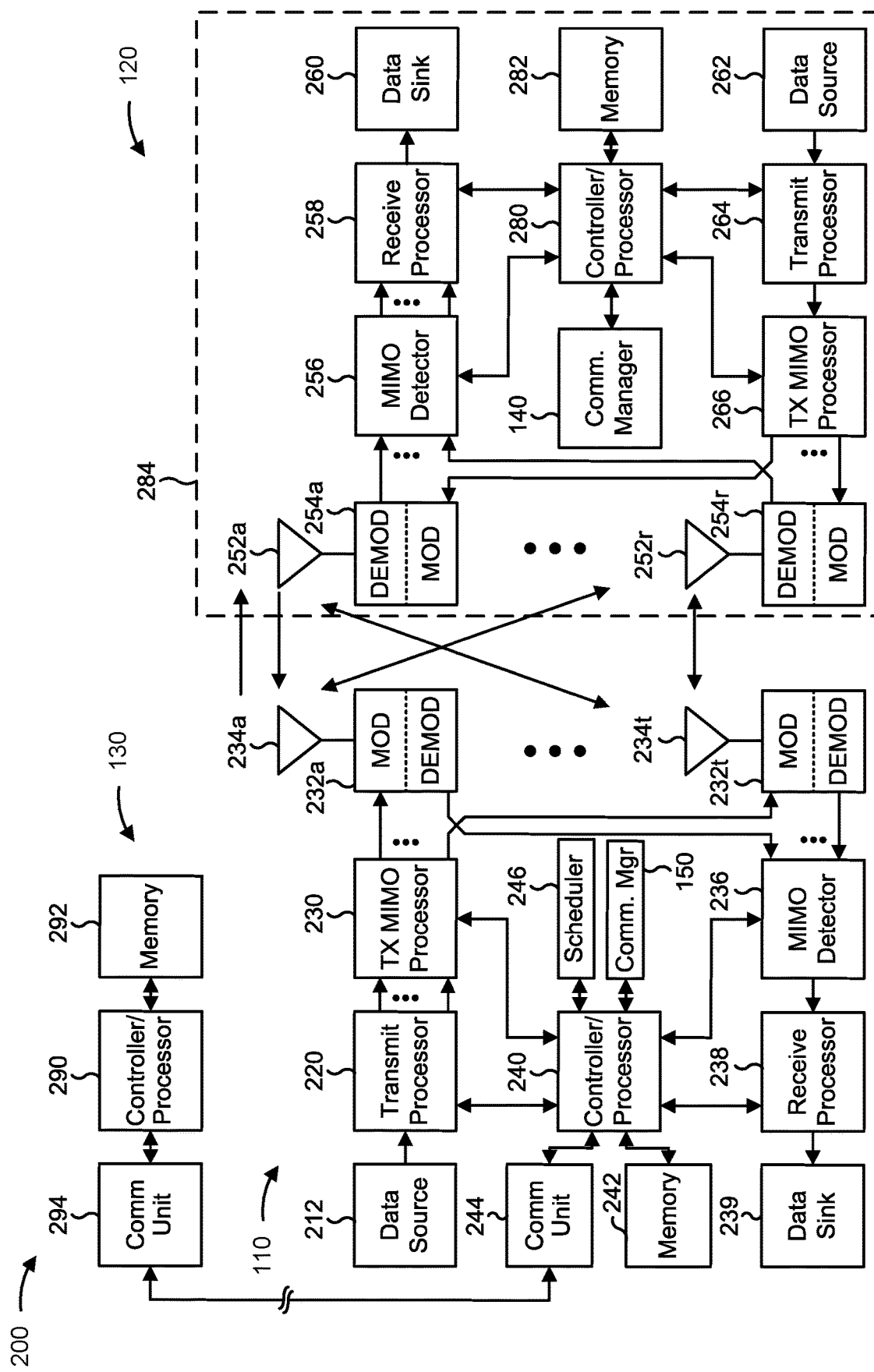
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with reception interference indication, as described in more detail elsewhere herein. In some aspects, a node described herein is the base station 110 is included in the base station 110, or includes one or more components of the base station 110 shown in FIG. 2. In some aspects, a node described herein is the UE 120, is included in the UE 120, or includes one or more components of the UE 120 shown in FIG. 2. The controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for transmitting, to a node, a list of frequency allocations that are associated with interference at the UE; and/or means for communicating in accordance with the list of frequency allocations. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a node (e.g., a base station 110 or a UE 120) includes means for receiving, from a UE, a list of frequency allocations that are associated with interference at the UE; and/or means for communicating in accordance with the list of frequency allocations. In some aspects, the means for the node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR BS, 5G NB, access point (AP), a TRP, or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
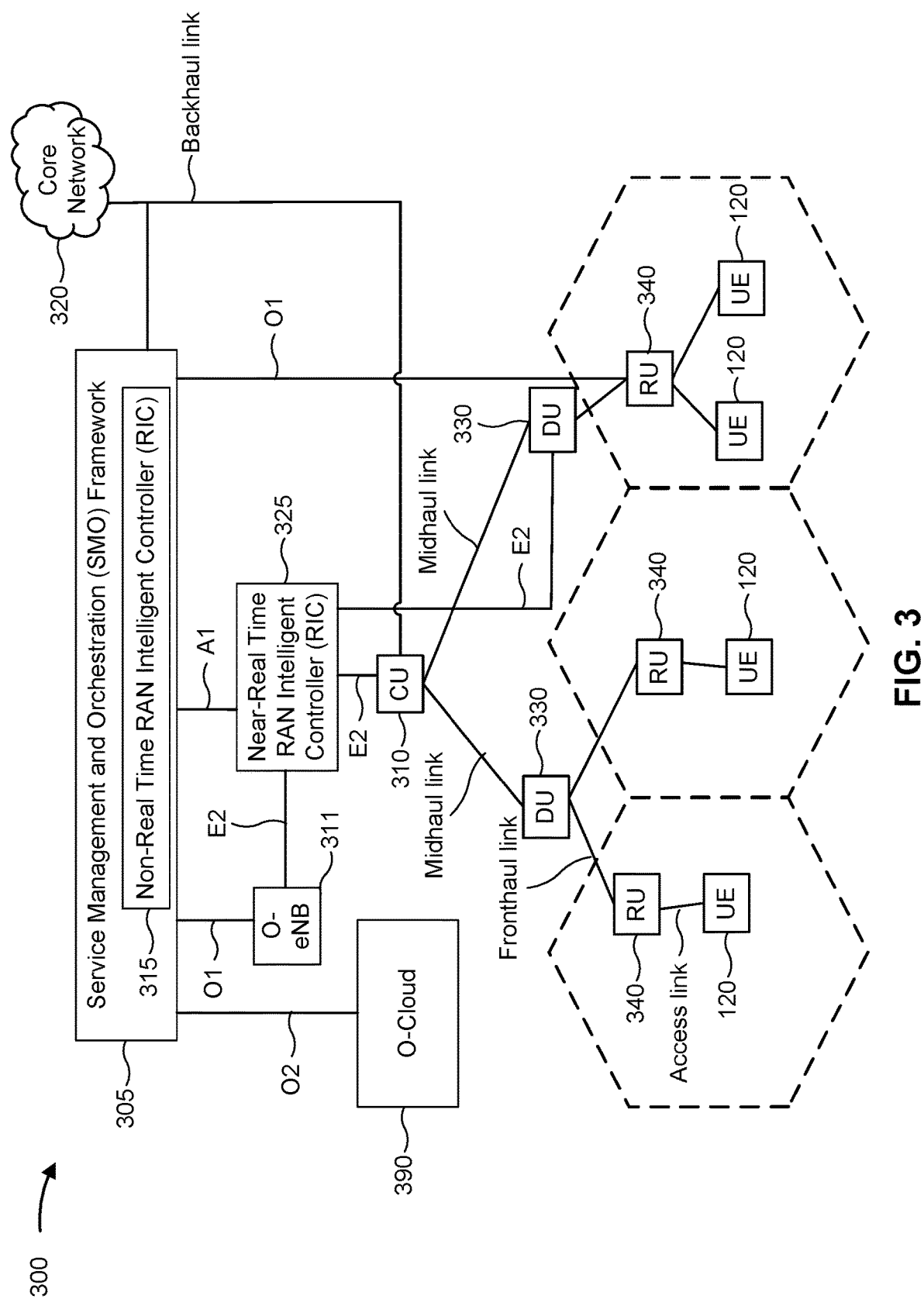
FIG. 3 is a diagram illustrating an example disaggregated base station architecture, in accordance with the present disclosure.

FIG. 3 is a diagram illustrating an example disaggregated base station 300 architecture, in accordance with the present disclosure. The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
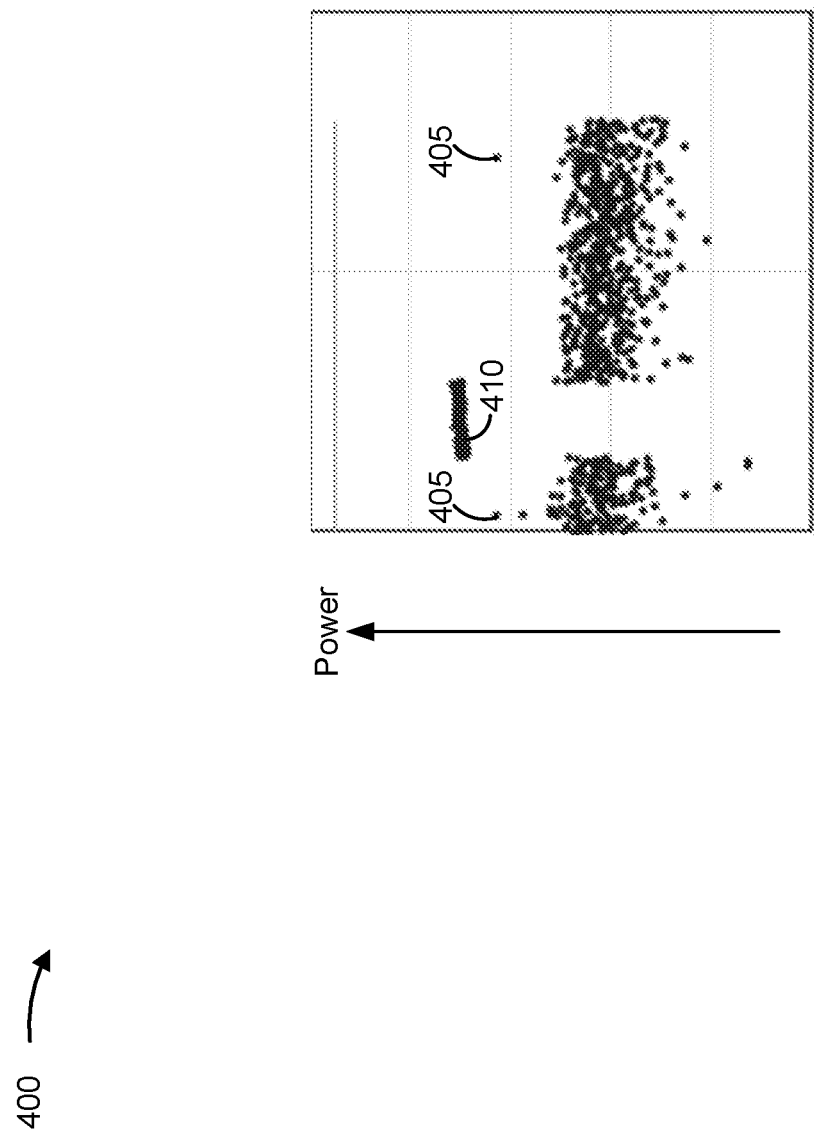
FIG. 4 is a diagram illustrating an example of reception interference, in accordance with the present disclosure.

FIG. 4 is a diagram illustrating an example 400 of reception interference, in accordance with the present disclosure.

Reception interference management has a significant role in downlink link optimization. Reception interference may be broadly classified as internal reception interference (e.g., interference caused by factors internal to a device) and external reception interference (e.g., interference caused by factors external to a device). Internal reception interference may be caused by spurs (also referred to as "spurious tones"). A spur is an emission, signal, or product on a frequency or frequencies that is not deliberately created by a device. FIG. 4 shows an example of spurs 405 in the FFT domain. As shown, a strength of the spurs may be slightly less than a strength of a data signal 410. However, in some cases, spurs may be stronger than a data signal.

In most modems (e.g., in LTE, NR, Sub-6 GHz, WiFi, V2X, millimeter wave, or the like), spurs may cause issues and may significantly affect the performance of communications. In particular, significant performance degradation may occur when spurs overlap (e.g., in frequency) with pilot signals for small allocations that use any MCS, or when spurs overlap with pilot signals for allocations of any size that use a high MCS. Spurs may be reduced by improving the isolation between components of a device. However, this may be challenging and costly. Furthermore, as the number of concurrent transmitters and receivers employed in a device increases, the effects of spurs becomes more significant. Moreover, the use of full duplex communication may introduce additional spurs that have not been previously addressed. In some examples, the phase and amplitude of a spur of a device may be estimated, and the device may employ a dedicated digital block to cancel the spur.

External reception interference at a device may be caused by other devices, cells, sources, or the like. For example, the interference may be caused by periodic or semi-persistent scheduling (SPS) resources from a neighbor base station (e.g., downlink channel state information reference signals (CSI-RS), uplink transmissions from other UEs in full duplex scenarios, or the like). In an example relating to an SPS allocation, a first UE may experience interference from a second UE, in an adjacent cell, that has been allocated resources that overlap with resources of the first UE (e.g., resources for CSI-RS, DMRS, or another reference signal allocation that cannot be signaled by reporting poor subband CQIs).

In a case of internal reception interference and/or external reception interference at a UE, only the UE experiencing interference may be aware of the frequency resources affected by interference (e.g., a base station or another UE in communication with the UE may not be aware of the frequency resources affected by interference). For internal reception interference, the UE may have a priori knowledge of sparse tones (e.g., which may vary from UE to UE). For external interference, the UE may detect interference in one or more adjacent resource blocks.

A receiving device (e.g., a UE) may employ one or more techniques to reduce spurs. In a time domain, spurs may be addressed using notch filtering to avoid saturation (e.g., in the FFT). However, one challenge associated with notch filtering relates to a convergence time for the notch filtering. In particular, the narrower a notch, the longer the convergence time. In some cases, one or more techniques may be employed to reduce the convergence time. In one such technique, known as "gear shifting," a convergence gear of a notch is monotonously increased as a function of the sample index.

Spur reduction in a frequency domain may be more complex relative to spur reduction in the time domain. For example, spur reduction in the frequency domain may utilize complex modeling. However, spur reduction in the frequency domain does not have the convergence time issues associated with spur reduction in the time domain. In some cases, for a strong spur, spur reduction in the frequency domain may result in clipping of an FFT block, which may spread the energy of the spur over the spectrum.

Techniques for spur reduction in the time domain and/or the frequency domain may consume a significant amount of power. Moreover, spurs may be unstable (e.g., the spur locations may change over time), and thus modeling approaches may be inaccurate and result in poor cancelation efficiency.

One spur reduction technique for the frequency domain, that may resolve one or more of the aforementioned issues, uses subcarrier nulling. Here, subcarriers affected by spurs may be addressed, for example, by ignoring those subcarriers for channel estimation (e.g., if a DMRS, or another reference signal, is allocated on the subcarriers), or by performing log likelihood ratio (LLR) zeroing (or whitening) at an input of a decoder (e.g., if a spur overlaps with a data transmission). Subcarrier nulling is a suboptimal approach, but is generally practical, as only a small performance loss is introduced with minimal complexity. In particular, subcarrier nulling may provide an acceptable performance loss when a spur overlaps with a data subcarrier (e.g., when a low or moderate coding rate is used). However, subcarrier nulling may have a noticeable effect when a high coding rate is used and/or when a small codeword length is used. In some cases, a spur may overlap with a pilot signal, resulting in a large performance loss (e.g., a few decibels may be lost in end-to-end performance when a pilot signal is lost in non-flat channels).

Some techniques and apparatuses described herein provide for reception interference indication. In some aspects, a UE (or another receiver device) may indicate, to a network entity or another UE, a list of frequency allocations, tones, or the like, that the UE would prefer downlink or sidelink transmissions to avoid (e.g., because the frequency allocations/tones are problematic for reception at the UE). For example, the UE may characterize interference at the UE, and transmit a request to the network entity that resources associated with the interference be avoided (e.g., not be used) for communication with the UE. As an example, the UE may identify spurs, learn an interference pattern associated with SPS, or the like, and transmit a request that resources associated with the spurs, the interference pattern, or the like, be avoided. The network entity or the other UE (or another transmitter device) may avoid allocating data or pilot signals on the frequency allocations or tones that the UE requested to avoid.

In this way, a performance of communications (e.g., downlink communications) of the UE may be improved, as internal spurs and external interference may limit the performance of communications associated with high MCSs, communications associated with small allocations, or pilot signal transmissions that overlap with a spur. Moreover, using the techniques described herein, a multi-RAT-capable UE (e.g., which may be associated with improved downlink communication) may be achieved without the need for extensive isolation of components of the UE.

As indicated above, FIG. 4 is provided as an example. Other examples may differ from what is described with respect to FIG. 4.

Figure 5:
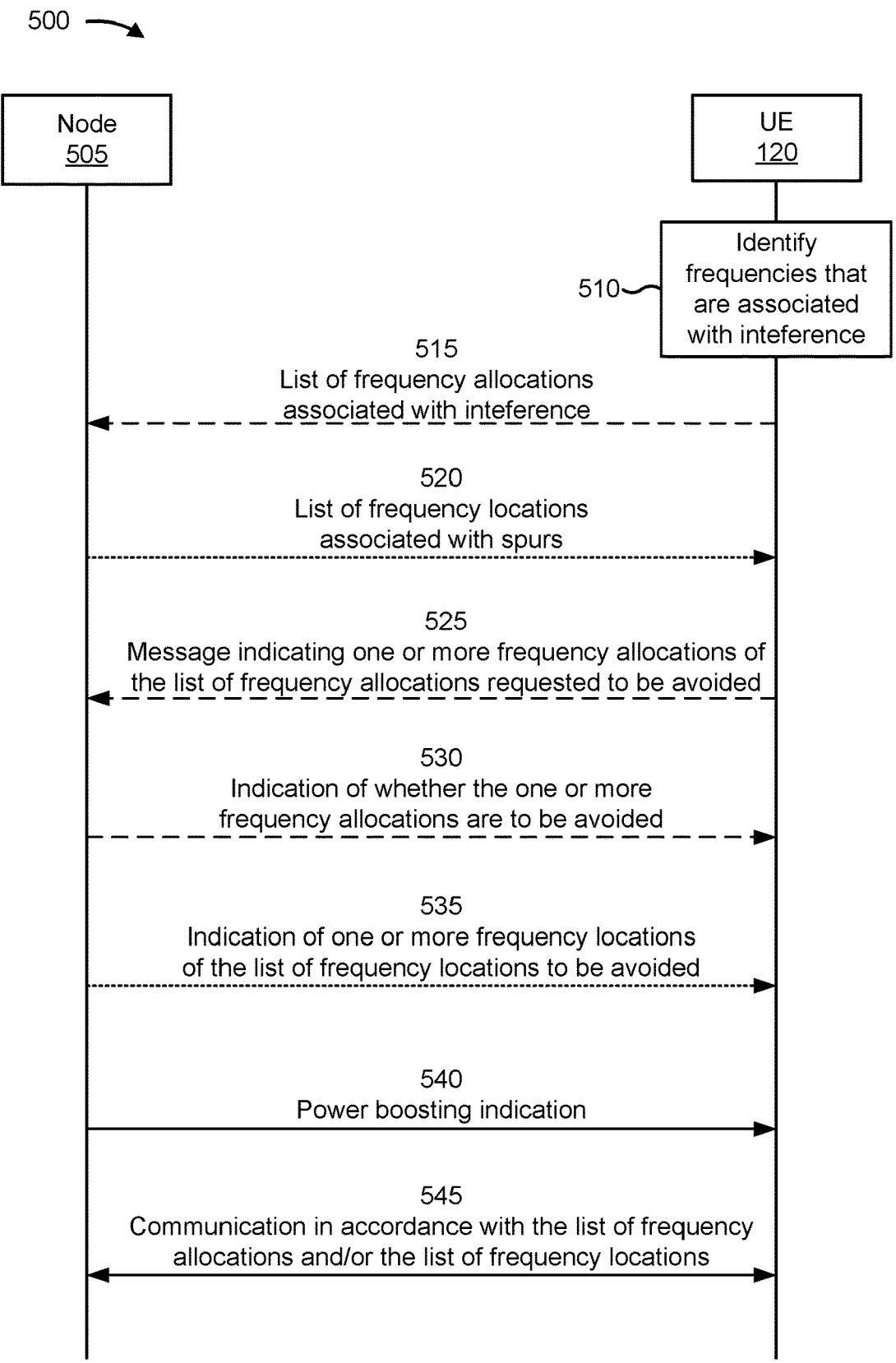
FIG. 5 is a diagram of an example associated with reception interference indication, in accordance with the present disclosure.

FIG. 5 is a diagram of an example 500 associated with reception interference indication, in accordance with the present disclosure. As shown in FIG. 5, a node 505 may communicate with a UE 120. In some aspects, the node 505 and the UE 120 may be part of a wireless network (e.g., wireless network 100). In some aspects, the node 505 may include a network entity (e.g., base station 110 or one or more components of a disaggregated base station, such as a CU 310, a DU 330, and/or an RU 340, among other examples). Here, the UE 120 may communicate with the node 505 via an access link. In some aspects, the node 505 may include another UE 120. Here, the UE 120 may communicate with the other UE 120 via a sidelink.

As shown by reference number 510, the UE 120 (e.g., a receiver device) may identify frequencies (e.g., resource elements) that are associated with interference at the UE 120. That is, the UE 120 may characterize interference at the UE 120.

In some aspects, the UE 120 may identify spurs (e.g., internal spurs) that are associated with interference at the UE 120. Here, the UE 120 may be provisioned with information that identifies spurs of the UE 120 and/or the UE 120 may determine the information that identifies spurs of the UE 120. For each spur, the information may indicate a frequency location (e.g., a frequency or a subcarrier index), a power, a phase, and/or an amplitude associated with the spur. In some aspects, the information that identifies the spurs of the UE 120 may be device-specific (e.g., specific to the UE 120). For example, the UE 120 may perform a spur detection procedure in an online mode of the UE 120, such that the spur detection is based at least in part on a current RF configuration and/or intermediate frequency (IF) configuration used by the UE 120.

In some aspects, the UE 120 may identify external interference at the UE 120. For example, the UE 120 may determine a signal-to-noise ratio (SNR), an interference level, or the like (e.g., based at least in part on a whitening matrix), for one or more particular tones or resource blocks (RBs). Continuing with the example, the UE 120 may determine whether the one or more particular tones or RBs are associated with external interference based at least in part on the SNR, the interference level, or the like (e.g., if an interference measurement associated with the one or more particular tones or RBs satisfies a threshold). In other words, to identify external interference, the UE 120 may perform an analysis of the SNR/interference level on particular tones/RBs, such as by performing a DMRS analysis, a data-aided analysis, or the like.

As shown by reference number 515, the UE 120 may transmit, and the node 505 may receive, a list of frequency allocations (e.g., information indicating one or more frequency allocations) that are associated with interference at the UE 120. For example, the UE 120 may signal to the node 505 the list of frequency allocations that the UE 120 desires to avoid for transmissions, such as downlink transmissions and/or sidelink transmissions, to the UE 120 (e.g., because the frequency allocations are associated with interference). The UE 120 may transmit the list of frequency allocations that are associated with interference at the UE 120 based at least in part on identifying frequencies that are associated with interference at the UE 120, as described herein. The "list" of frequency allocations may refer to information that identifies the frequency allocations, whether according to a particular order or unordered. The frequency allocations of the list may be indexed by an order in which the frequency allocations appear in the list.

In some aspects, frequency allocations, of the list of frequency allocations, are associated with spurs (e.g., reception spurs) of the UE 120 and/or external interference at the UE 120. In some aspects, the list of frequency allocations may indicate a frequency allocation by a starting frequency (e.g., in Hz) and an ending frequency (e.g., in Hz). In some aspects, the UE 120 may transmit the list of frequency allocations upon establishing an RRC connection of the UE 120. In some aspects, the UE 120 may transmit the list of frequency allocations in an RRC message and/or in a medium access control control element (MAC-CE) message. For example, the UE 120 may transmit a list of one or more frequency allocations associated with spurs of the UE 120 in an RRC message and/or a MAC-CE message. As another example, the UE 120 may transmit a list of one or more frequency allocations associated with external interference at the UE 120 in a MAC-CE message. Thus, the UE 120 may provide the list of frequency allocations in a single message or in multiple messages.

As shown by reference number 520, the node 505 may transmit, and the UE 120 may receive, a list of frequency locations that are associated with spurs (e.g., reception spurs) of the node 505 (and/or a list of frequency allocations that are associated with interference at the node 505). In some aspects, the node 505 may transmit the list of frequency locations upon an RRC connection of the UE 120 being established. In some aspects, the list of frequency locations may indicate a frequency location in units of frequency (e.g., in Hz) or by a subcarrier index (e.g., relative to 0). The "list" of frequency locations may refer to information that identifies the frequency locations, whether according to a particular order or unordered. The frequency locations of the list may be indexed by an order in which the frequency locations appear in the list.

As shown by reference number 525, the UE 120 may transmit, and the node 505 may receive, a message indicating one or more frequency allocations, of the list of frequency allocations associated with interference at the UE 120 (described in connection with reference number 515), that are requested to be avoided for transmissions to the UE 120. For example, the UE 120 may signal information indicating a set of indices, of the list of frequency allocations, that the UE 120 requests to be avoided. The message may be a MAC-CE message. The UE 120 may transmit the message after the RRC connection of the UE 120 (e.g., during traffic), to indicate which frequency allocations, of the list of frequency allocations, are relevant to (e.g., will be affected by) a current configuration of the UE 120. In other words, the one or more frequency allocations, that are requested to be avoided, may be based at least in part on (e.g., may be determined by the UE 120 based at least in part on) a configuration of one or more component carriers for the UE 120 and/or a configuration of one or more bandwidth parts for the UE 120. Thus, the UE 120 may transmit the message upon a configuration (e.g., a reconfiguration) of the UE 120 (e.g., a reconfiguration of one or more component carriers for the UE 120).

As shown by reference number 530, the node 505 may transmit, and the UE 120 may receive, an indication of whether the one or more frequency allocations, requested to be avoided by the UE 120, are to be avoided for transmissions to the UE 120. The indication may indicate which of the one or more frequency allocations are to be avoided and/or which of the one or more frequency allocations are not to be avoided (e.g., the indication may grant, grant in part, or deny the request to avoid the one or more frequency allocations). For example, the node 505 may signal information indicating a set of indices, of the set of indices requested to be avoided by the UE 120, that are to be avoided for transmissions to the UE 120. Thus, the node 505 may avoid allocating data (e.g., physical downlink control channels (PDCCHs) and/or physical downlink shared channels (PDSCHs)) and/or pilot signals (e.g., DMRSs, phase tracking reference signals (PTRSs), and/or a CSI-RSs) on frequency allocations that are indicated to be avoided. The node 505 may transmit the indication in a MAC-CE message and/or in a downlink control information (DCI) message.

In some aspects, the indication from the node 505 may indicate an association between at least one frequency allocation (e.g., of the one or more frequency allocations requested to be avoided) and a particular component carrier configuration for the UE 120 and/or a particular bandwidth part configuration for the UE 120. For example, the indication may indicate an association between at least one index (e.g., of the set of indices requested to be avoided) and a particular component carrier configuration for the UE 120 and/or a particular bandwidth part configuration for the UE 120. The association may indicate that the frequency allocation(s) is (are) to be avoided when the particular component carrier configuration for the UE 120 and/or a particular bandwidth part configuration for the UE 120 is active.

When communicating with the node 505, the UE 120 may rate match around frequency allocations that are indicated to be avoided (e.g., in association with a particular component carrier configuration for the UE 120 and/or a particular bandwidth part configuration for the UE 120). For example, the UE 120 may implicitly rate match around the frequency allocations without dynamic signaling from the node 505 indicating that the UE 120 is to rate match around the frequency allocations. In rate matching, allocated resources for a channel do not have modulated symbols, as if those resources are not allocated to the channel.

As shown by reference number 535, the node 505 may transmit, and the UE 120 may receive, an indication of one or more frequency locations, of the list of frequency locations associated with spurs of the node 505 (described in connection with reference number 520), that are to be avoided (e.g., that are requested to be avoided) for transmissions, such as uplink transmissions, to the node 505. For example, the node 505 may signal information indicating a set of indices, of the list of frequency locations, that are to be avoided. The node 505 may transmit the indication in a MAC-CE message and/or a DCI message. The node 505 may transmit the message after the RRC connection of the UE 120 (e.g., during traffic), to indicate which frequency locations, of the list of frequency locations, are relevant to (e.g., will be affected by) a current configuration of the UE 120. In other words, the one or more frequency locations, that are indicated to be avoided, may be based at least in part on (e.g., may be determined by the node 505 based at least in part on) a configuration of one or more component carriers for the UE 120 and/or a configuration of one or more bandwidth parts for the UE 120. Thus, the node 505 may transmit the indication upon a configuration (e.g., a reconfiguration) of the UE 120 (e.g., a reconfiguration of one or more component carriers for the UE 120).

When communicating with the UE 120, the node 505 may perform rate matching on the one or more frequency locations (e.g., tones) indicated to be avoided (e.g., if the one or more frequency locations overlap with a data transmission). Additionally, or alternatively, when communicating with the UE 120, the node 505 may ignore the one or more frequency locations (e.g., tones) indicated to be avoided (e.g., if the one or more frequency locations overlap with pilot signals).

As shown by reference number 540, the node 505 may transmit, and the UE 120 may receive, a power boosting indication. The node 505 may signal the power boosting indication in a MAC-CE message and/or a DCI message. In some aspects, the power boosting indication may relate to the one or more frequency allocations that are indicated to be avoided (as described in connection with reference number 530). For example, the power boosting indication may indicate a power boosting value that is to be used for one or more transmissions to the UE 120 on one or more tones in the one or more frequency allocations (e.g., if the one or more frequency allocations are not avoided). In some aspects, the power boosting indication may relate to the one or more frequency locations that are indicated to be avoided (as described in connection with reference number 535). For example, the power boosting indication may indicate a power boosting value that is to be used for one or more transmissions to the node 505 on one or more tones in the one or more frequency locations (e.g., if the one or more frequency locations are not avoided).

As shown by reference number 545, the UE 120 may communicate in accordance with the list of frequency allocations and/or the list of frequency locations, and the node 505 may communicate in accordance with the list of frequency allocations and/or the list of frequency locations. For example, the UE 120 and/or the node 505 may communicate in accordance with the one or more frequency allocations that are indicated to be avoided and/or the one or more frequency locations that are indicated to be avoided.

In some aspects, the node 505 may allocate more power for transmissions on tones (e.g., subcarriers) that are in the one or more frequency allocations or frequency locations that are indicated to be avoided (as described in connection with reference numbers 530 and 535, respectively). For example, to communicate in accordance with the list of frequency allocations or the list of frequency locations, the node 505 and/or the UE 120 may perform a transmission on the tones (e.g., if the tones are not avoided) in accordance with the power boosting value indicated by the power boosting indication.

In some aspects, the node 505 may refrain from allocating data signals or pilot signals on tones (e.g., subcarriers) that are in the one or more frequency allocations or frequency locations that are indicated to be avoided. For example, to communicate in accordance with the list of frequency allocations, the UE 120 and/or the node 505 may communicate based at least in part on a resource allocation, for one or more transmissions to the UE 120 (e.g., data transmissions and/or pilot signal transmissions), that avoids tones (e.g., subcarriers) in the one or more frequency allocations that are indicated to be avoided. In general, refraining from allocating data signals on the tones may have a small impact on throughput (e.g., there is only a relative throughput loss due to the avoided tones). Thus, the UE 120 may perform rate matching on the avoided tones. However, refraining from allocating pilot signals on the tones may result in significant performance loss, particularly in channels with frequency selectivity. In some aspects, the node 505 may determine that one or more transmissions to the UE 120 are to avoid tones in one or more frequency allocations that are indicated to be avoided and/or that additional power is to be used for one or more transmissions to the UE 120 on one or more tones in one or more frequency allocations that are indicated to be avoided (e.g., and the node 505 may allocate more power and/or refrain from allocating data signals or pilot signals, as described herein, accordingly).

Accordingly, in some aspects, the node 505 may allocate pilot signals so as not to coincide (e.g., overlap) with the interference associated with the one or more frequency allocations or frequency locations that are indicated to be avoided. For example, to communicate in accordance with the list of frequency allocations, the node 505 may transmit, and the UE 120 may receive, one or more pilot signals in resources that avoid the one or more frequency allocations that are indicated to be avoided. In some aspects, the resources may be shifted relative to a pattern for the one or more pilot signals.

In some aspects, to allocate pilot signals in resources that avoid the one or more frequency allocations, the node 505 may transmit, and the UE 120 may receive, an update to a bandwidth part that is to be used by the UE 120. In some aspects, to allocate pilot signals in resources that avoid the one or more frequency allocations, the node 505 may refrain from allocating, for the UE 120, RBs that are affected by the interference associated with the one or more frequency allocations (e.g., if a spur overlaps with a DMRS in a particular RB, the node 505 may refrain from allocating the RB). In some aspects, to allocate pilot signals in resources that avoid the one or more frequency allocations, the node 505 may indicate, to the UE 120, a frequency shifting value and/or a time shifting value for one or more pilot signals (e.g., relative to respective resource patterns for the one or more pilot signals) that results in avoidance of the interference associated with the one or more frequency allocations. For CSI-RS, a frequency shifting value may be referred to as a "K0" value and a time shifting value may be referred to as an "L0" value, which are indicated in 3GPP Technical Specification (TS) 38.211 in Table 7.4.1.5.3-1. For PTRS, a frequency shifting value may be referred to as a "$K_{ref}^{RE}$" value, which is indicated in 3GPP TS 38.211 in Table 7.4.1.2.2. In some aspects, to allocate pilot signals in resources that avoid the one or more frequency allocations, the node 505 may indicate, to the UE 120, a shift (e.g., in frequency and/or in time) of a pilot signal pattern (e.g., a DMRS pattern) for one or more RBs (e.g., one or more RBs in which a spur overlaps with a pilot signal). Here, the node 505 may indicate, to the UE 120, in one or more fields of a message (e.g., an RRC message, a MAC-CE message, a DCI message, or the like), an RB list of the one or more RBs being shifted and/or an amount of shift in time and/or in frequency.

In this way, communications between the UE 120 and the node 505 may avoid, or otherwise address, internal spurs and/or external interference at the UE 120, thereby improving the performance of the communications.

As indicated above, FIG. 5 is provided as an example. Other examples may differ from what is described with regard to FIG. 5.

Figure 6:
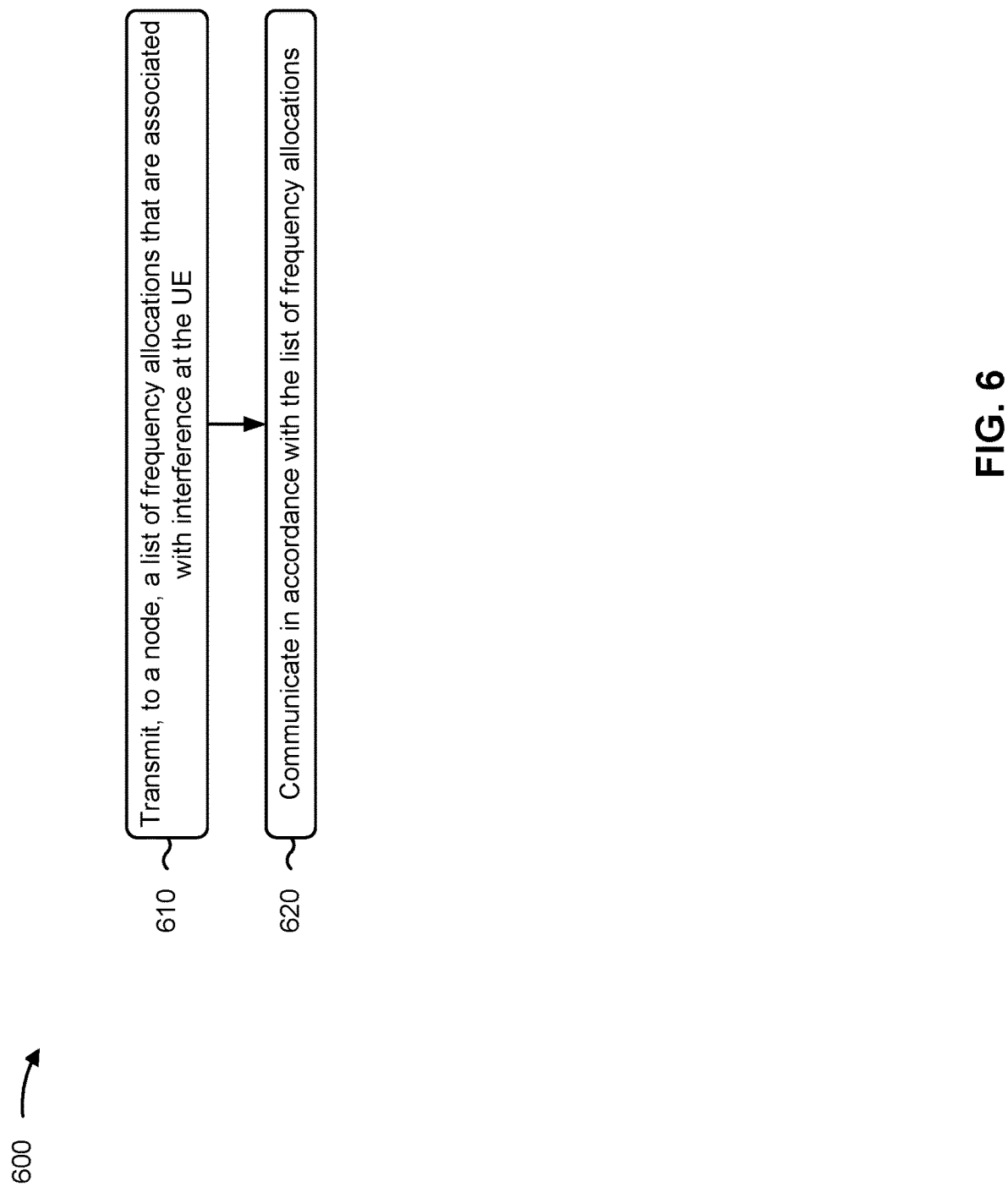
FIGS. 6-7 are diagrams illustrating example processes associated with reception interference indication, in accordance with the present disclosure.

FIG. 6 is a diagram illustrating an example process 600 performed, for example, by a UE, in accordance with the present disclosure. Example process 600 is an example where the UE (e.g., UE 120) performs operations associated with reception interference indication.

As shown in FIG. 6, in some aspects, process 600 may include transmitting, to a node, a list of frequency allocations that are associated with interference at a UE (block 610). For example, the UE (e.g., using communication manager 140 and/or transmission component 804, depicted in FIG. 8) may transmit, to a node, a list of frequency allocations that are associated with interference at the UE, as described above.

As further shown in FIG. 6, in some aspects, process 600 may include communicating in accordance with the list of frequency allocations (block 620). For example, the UE (e.g., using communication manager 140, reception component 802, and/or transmission component 804, depicted in FIG. 8) may communicate in accordance with the list of frequency allocations, as described above.

Process 600 may include additional aspects, such as any single aspect or any combination of aspects described below and/or in connection with one or more other processes described elsewhere herein.

In a first aspect, the node is a network entity or another UE.

In a second aspect, alone or in combination with the first aspect, frequency allocations, of the list of frequency allocations, are associated with at least one of one or more spurs of the UE, or external interference at the UE.

In a third aspect, alone or in combination with one or more of the first and second aspects, the list of frequency allocations indicates a frequency allocation by a starting frequency and an ending frequency.

In a fourth aspect, alone or in combination with one or more of the first through third aspects, the list of frequency allocations is transmitted in at least one of an RRC message, or a MAC-CE.

In a fifth aspect, alone or in combination with one or more of the first through fourth aspects, process 600 includes transmitting, to the node, a message indicating one or more frequency allocations, of the list of frequency allocations, that are requested to be avoided for transmissions to the UE.

In a sixth aspect, in combination with the fifth aspect, the message is a MAC-CE message.

In a seventh aspect, in combination with one or more of the fifth through sixth aspects, the one or more frequency allocations that are requested to be avoided are based at least in part on at least one of a configuration of one or more component carriers for the UE, or a configuration of one or more bandwidth parts for the UE.

In an eighth aspect, in combination with one or more of the fifth through seventh aspects, process 600 includes receiving, from the node, an indication of whether the one or more frequency allocations are to be avoided for transmissions to the UE.

In a ninth aspect, in combination with the eighth aspect, the indication is in a MAC-CE or in DCI.

In a tenth aspect, in combination with one or more of the eighth through ninth aspects, the indication indicates an association between at least one frequency allocation, of the one or more frequency allocations, and at least one of a particular component carrier configuration for the UE, or a particular bandwidth part configuration for the UE.

In an eleventh aspect, in combination with one or more of the eighth through tenth aspects, communicating in accordance with the list of frequency allocations includes communicating based at least in part on a resource allocation, for one or more transmissions to the UE, that avoids tones in the one or more frequency allocations that are indicated to be avoided.

In a twelfth aspect, in combination with one or more of the eighth through eleventh aspects, process 600 includes receiving, from the node, another indication of a power boosting value that is to be used for one or more transmissions to the UE on one or more tones in the one or more frequency allocations that are indicated to be avoided.

In a thirteenth aspect, in combination with the twelfth aspect, the other indication is in a MAC-CE or in DCI.

In a fourteenth aspect, in combination with one or more of the eighth through thirteenth aspects, communicating in accordance with the list of frequency allocations includes receiving, from the node, one or more pilot signals in resources that avoid the one or more frequency allocations that are indicated to be avoided.

In a fifteenth aspect, in combination with the fourteenth aspect, the resources are shifted relative to a pattern for the one or more pilot signals.

In a sixteenth aspect, alone or in combination with one or more of the first through fifteenth aspects, process 600 includes receiving, from the node, a list of frequency locations that are associated with spurs of the node.

In a seventeenth aspect, in combination with the sixteenth aspect, the list of frequency locations is received via RRC signaling.

In an eighteenth aspect, in combination with one or more of the sixteenth through seventeenth aspects, process 600 includes receiving, from the node, an indication of one or more frequency locations, of the list of frequency locations, that are to be avoided for transmissions to the node.

In a nineteenth aspect, in combination with the eighteenth aspect, the indication is in a MAC-CE or in DCI.

In a twentieth aspect, in combination with one or more of the eighteenth through nineteenth aspects, the one or more frequency locations that are indicated to be avoided are based at least in part on at least one of a configuration of one or more component carriers for the UE, or a configuration of one or more bandwidth parts for the UE.

In a twenty-first aspect, in combination with one or more of the eighteenth through twentieth aspects, process 600 includes receiving, from the node, another indication of a power boosting value that is to be used for one or more transmissions to the node on one or more tones in the one or more frequency locations that are indicated to be avoided.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
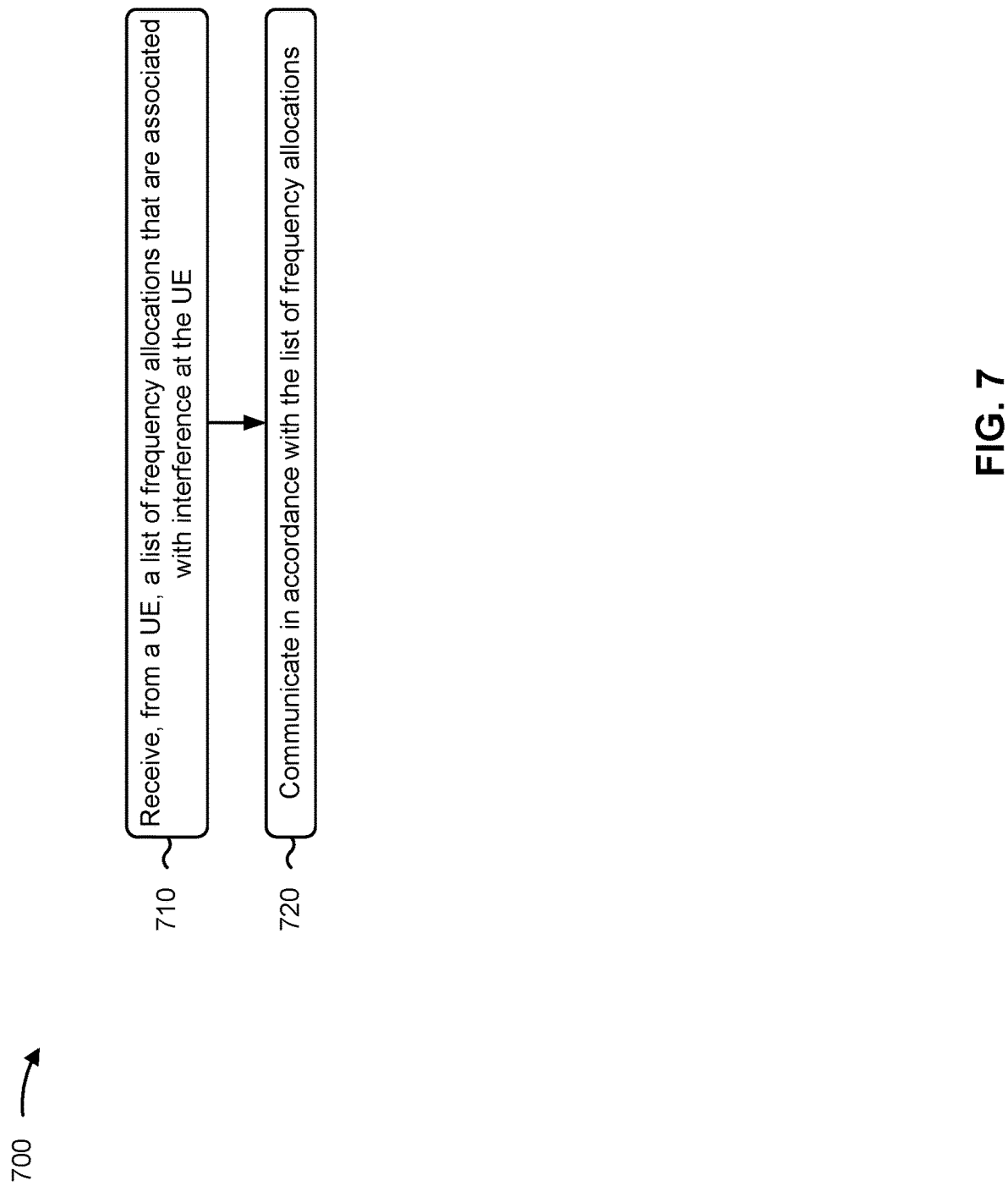

FIG. 7 is a diagram illustrating an example process 700 performed, for example, by a node, in accordance with the present disclosure. Example process 700 is an example where the node (e.g., a base station 110 or a UE 120) performs operations associated with reception interference indication.

As shown in FIG. 7, in some aspects, process 700 may include receiving, from a UE, a list of frequency allocations that are associated with interference at the UE (block 710). For example, the node (e.g., using communication manager 908 and/or reception component 902, depicted in FIG. 9) may receive, from a UE, a list of frequency allocations that are associated with interference at the UE, as described above.

As further shown in FIG. 7, in some aspects, process 700 may include communicating in accordance with the list of frequency allocations (block 720). For example, the node (e.g., using communication manager 908, reception component 902, and/or transmission component 904, depicted in FIG. 9) may communicate in accordance with the list of frequency allocations, as described above.

Process 700 may include additional aspects, such as any single aspect or any combination of aspects described below and/or in connection with one or more other processes described elsewhere herein.

In a first aspect, the node is a network entity or another UE.

In a second aspect, alone or in combination with the first aspect, frequency allocations, of the list of frequency allocations, are associated with at least one of one or more spurs of the UE, or external interference at the UE.

In a third aspect, alone or in combination with one or more of the first and second aspects, the list of frequency allocations indicates a frequency allocation by a starting frequency and an ending frequency.

In a fourth aspect, alone or in combination with one or more of the first through third aspects, the list of frequency allocations is received in at least one of an RRC message, or a MAC-CE.

In a fifth aspect, alone or in combination with one or more of the first through fourth aspects, process 700 includes receiving, from the UE, a message indicating one or more frequency allocations, of the list of frequency allocations, that are requested to be avoided for transmissions to the UE.

In a sixth aspect, in combination with the fifth aspect, the message is a MAC-CE message.

In a seventh aspect, in combination with one or more of the fifth through sixth aspects, the one or more frequency allocations that are requested to be avoided are based at least in part on at least one of a configuration of one or more component carriers for the UE, or a configuration of one or more bandwidth parts for the UE.

In an eighth aspect, in combination with one or more of the fifth through seventh aspects, process 700 includes transmitting, to the UE, an indication of whether the one or more frequency allocations are to be avoided for transmissions to the UE.

In a ninth aspect, in combination with the eighth aspect, the indication is in a MAC-CE or in DCI.

In a tenth aspect, in combination with one or more of the eighth through ninth aspects, the indication indicates an association between at least one frequency allocation, of the one or more frequency allocations, and at least one of a particular component carrier configuration for the UE, or a particular bandwidth part configuration for the UE.

In an eleventh aspect, in combination with one or more of the eighth through tenth aspects, process 700 includes determining that at least one of one or more transmissions to the UE are to avoid tones in the one or more frequency allocations that are indicated to be avoided, or additional power is to be used for one or more transmissions to the UE on one or more tones in the one or more frequency allocations that are indicated to be avoided.

In a twelfth aspect, in combination with one or more of the eighth through eleventh aspects, communicating in accordance with the list of frequency allocations includes communicating based at least in part on a resource allocation, for one or more transmissions to the UE, that avoids tones in the one or more frequency allocations that are indicated to be avoided.

In a thirteenth aspect, in combination with one or more of the eighth through twelfth aspects, process 700 includes transmitting, to the UE, another indication of a power boosting value that is to be used for one or more transmissions to the UE on one or more tones in the one or more frequency allocations that are indicated to be avoided.

In a fourteenth aspect, in combination with the thirteenth aspect, the other indication is in a MAC-CE or in DCI.

In a fifteenth aspect, in combination with one or more of the eighth through fourteenth aspects, communicating in accordance with the list of frequency allocations includes transmitting, to the UE, one or more pilot signals in resources that avoid the one or more frequency allocations that are indicated to be avoided.

In a sixteenth aspect, in combination with the fifteenth aspect, the resources are shifted relative to a pattern for the one or more pilot signals.

In a seventeenth aspect, alone or in combination with one or more of the first through sixteenth aspects, process 700 includes transmitting, to the UE, a list of frequency locations that are associated with spurs of the node.

In an eighteenth aspect, in combination with the seventeenth aspect, the list of frequency locations is received via RRC signaling.

In a nineteenth aspect, in combination with one or more of the seventeenth through eighteenth aspects, process 700 includes transmitting, to the UE, an indication of one or more frequency locations, of the list of frequency locations, that are to be avoided for transmissions to the node.

In a twentieth aspect, in combination with the nineteenth aspect, the indication is in a MAC-CE or in DCI.

In a twenty-first aspect, in combination with one or more of the nineteenth through twentieth aspects, the one or more frequency locations that are indicated to be avoided are based at least in part on at least one of a configuration of one or more component carriers for the UE, or a configuration of one or more bandwidth parts for the UE.

In a twenty-second aspect, in combination with one or more of the nineteenth through twenty-first aspects, process 700 includes transmitting, to the UE, another indication of a power boosting value that is to be used for one or more transmissions to the node on one or more tones in the one or more frequency locations that are indicated to be avoided.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
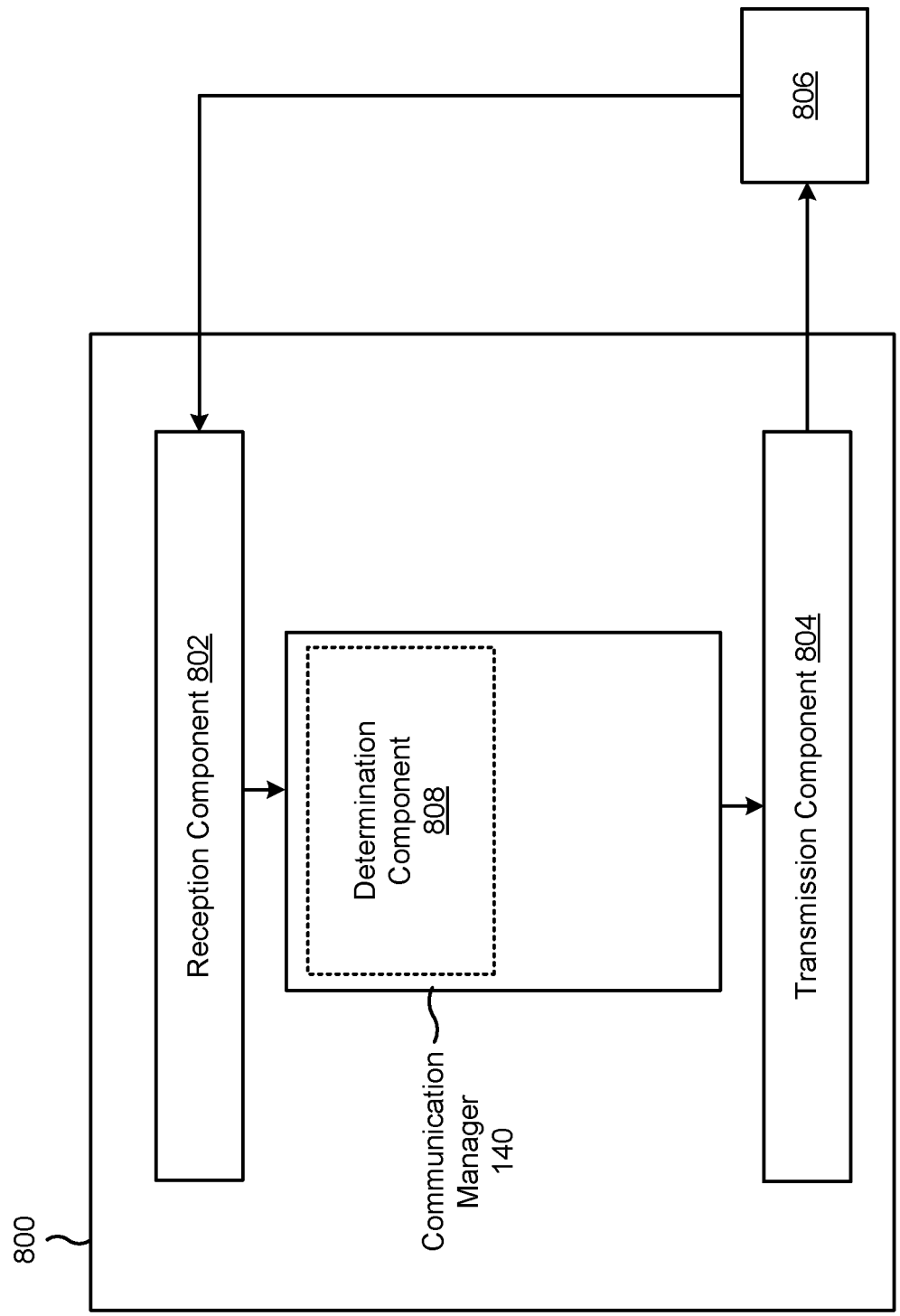
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a determination component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The determination component 808 may identify frequencies that are associated with interference at the apparatus 800. The transmission component 804 may transmit, to a node, a list of frequency allocations that are associated with interference at apparatus 800. The transmission component 804 and/or the reception component 802 may communicate in accordance with the list of frequency allocations.

The transmission component 804 may transmit, to the node, a message indicating one or more frequency allocations, of the list of frequency allocations, that are requested to be avoided for transmissions to the apparatus 800. The reception component 802 may receive, from the node, an indication of whether the one or more frequency allocations are to be avoided for transmissions to the apparatus 800. The reception component 802 may receive, from the node, another indication of a power boosting value that is to be used for one or more transmissions to the apparatus 800 on one or more tones in the one or more frequency allocations that are indicated to be avoided.

The reception component 802 may receive, from the node, a list of frequency locations that are associated with spurs of the node. The reception component 802 may receive, from the node, an indication of one or more frequency locations, of the list of frequency locations, that are to be avoided for transmissions to the node. The reception component 802 may receive, from the node, another indication of a power boosting value that is to be used for one or more transmissions to the node on one or more tones in the one or more frequency locations that are indicated to be avoided.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
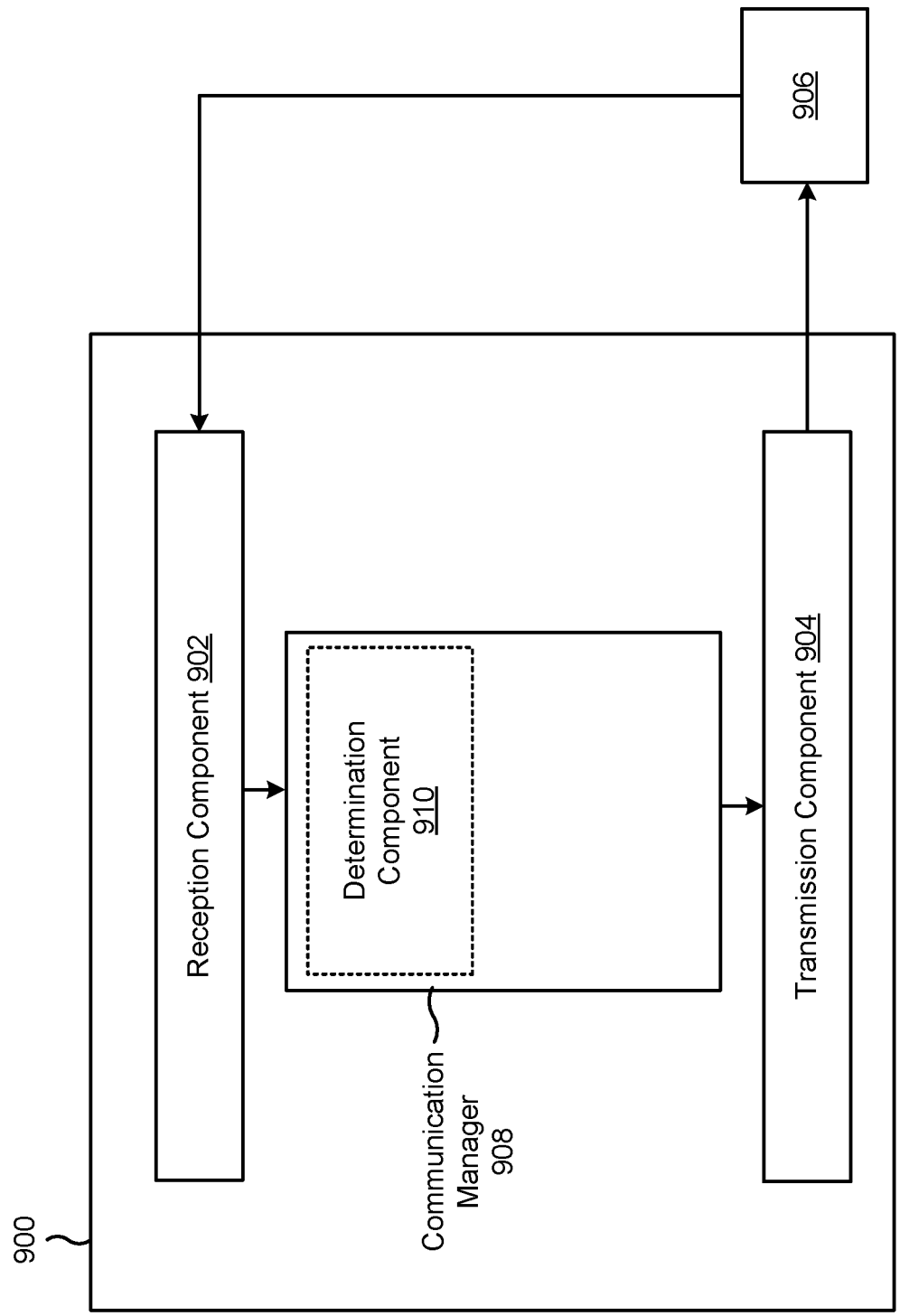

FIG. 9 is a diagram of an example apparatus 900 for wireless communication. The apparatus 900 may be a node (e.g., a network entity or a UE 120), or a node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908. The communication manager 908 may be, may be similar to, or may include, the communication manager 140 and/or the communication manager 150. The communication manager 908 may include a determination component 910, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the node described in connection with FIG. 2. In some aspects, the transmission component 904 may be co-located with the reception component 902 in a transceiver.

The reception component 902 may receive, from a UE, a list of frequency allocations that are associated with interference at the UE. The reception component 902 and/or the transmission component 904 may communicate in accordance with the list of frequency allocations.

The reception component 902 may receive, from the UE, a message indicating one or more frequency allocations, of the list of frequency allocations, that are requested to be avoided for transmissions to the UE. The transmission component 904 may transmit, to the UE, an indication of whether the one or more frequency allocations are to be avoided for transmissions to the UE. The determination component 910 may determine that one or more transmissions to the UE are to avoid tones in the one or more frequency allocations that are indicated to be avoided, and/or that additional power is to be used for one or more transmissions to the UE on one or more tones in the one or more frequency allocations that are indicated to be avoided. The transmission component 904 may transmit, to the UE, another indication of a power boosting value that is to be used for one or more transmissions to the UE on one or more tones in the one or more frequency allocations that are indicated to be avoided.

The determination component 910 may identify frequencies that are associated with spurs of the apparatus 900. The transmission component 904 may transmit, to the UE, a list of frequency locations that are associated with spurs of the apparatus 900. The transmission component 904 may transmit, to the UE, an indication of one or more frequency locations, of the list of frequency locations, that are to be avoided for transmissions to the apparatus 900. The transmission component 904 may transmit, to the UE, another indication of a power boosting value that is to be used for one or more transmissions to the apparatus 900 on one or more tones in the one or more frequency locations that are indicated to be avoided.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting, to a node, a list of frequency allocations that are associated with interference at the UE; and communicating in accordance with the list of frequency allocations.

Aspect 2: The method of Aspect 1, wherein the node is a network entity or another UE.

Aspect 3: The method of any of Aspects 1-2, wherein frequency allocations, of the list of frequency allocations, are associated with at least one of: one or more spurs of the UE, or external interference at the UE.

Aspect 4: The method of any of Aspects 1-3, wherein the list of frequency allocations indicates a frequency allocation by a starting frequency and an ending frequency.

Aspect 5: The method of any of Aspects 1-4, wherein the list of frequency allocations is transmitted in at least one of: a radio resource control message, or a medium access control control element (MAC-CE).

Aspect 6: The method of any of Aspects 1-5, further comprising: transmitting, to the node, a message indicating one or more frequency allocations, of the list of frequency allocations, that are requested to be avoided for transmissions to the UE.

Aspect 7: The method of Aspect 6, wherein the message is a medium access control control element message.

Aspect 8: The method of any of Aspects 6-7, wherein the one or more frequency allocations that are requested to be avoided are based at least in part on at least one of: a configuration of one or more component carriers for the UE, or a configuration of one or more bandwidth parts for the UE.

Aspect 9: The method of any of Aspects 6-8, further comprising: receiving, from the node, an indication of whether the one or more frequency allocations are to be avoided for transmissions to the UE.

Aspect 10: The method of Aspect 9, wherein the indication is in a medium access control control element or in downlink control information.

Aspect 11: The method of any of Aspects 9-10, wherein the indication indicates an association between at least one frequency allocation, of the one or more frequency allocations, and at least one of: a particular component carrier configuration for the UE, or a particular bandwidth part configuration for the UE.

Aspect 12: The method of any of Aspects 9-11, wherein communicating in accordance with the list of frequency allocations comprises: communicating based at least in part on a resource allocation, for one or more transmissions to the UE, that avoids tones in the one or more frequency allocations that are indicated to be avoided.

Aspect 13: The method of any of Aspects 9-12, further comprising: receiving, from the node, another indication of a power boosting value that is to be used for one or more transmissions to the UE on one or more tones in the one or more frequency allocations that are indicated to be avoided.

Aspect 14: The method of Aspect 13, wherein the other indication is in a medium access control control element or in downlink control information.

Aspect 15: The method of any of Aspects 9-14, wherein communicating in accordance with the list of frequency allocations comprises: receiving, from the node, one or more pilot signals in resources that avoid the one or more frequency allocations that are indicated to be avoided.

Aspect 16: The method of Aspect 15, wherein the resources are shifted relative to a pattern for the one or more pilot signals.

Aspect 17: The method of any of Aspects 1-16, further comprising: receiving, from the node, a list of frequency locations that are associated with spurs of the node.

Aspect 18: The method of Aspect 17, wherein the list of frequency locations is received via radio resource control signaling.

Aspect 19: The method of any of Aspects 17-18, further comprising: receiving, from the node, an indication of one or more frequency locations, of the list of frequency locations, that are to be avoided for transmissions to the node.

Aspect 20: The method of Aspect 19, wherein the indication is in a medium access control control element or in downlink control information.

Aspect 21: The method of any of Aspects 19-20, wherein the one or more frequency locations that are indicated to be avoided are based at least in part on at least one of: a configuration of one or more component carriers for the UE, or a configuration of one or more bandwidth parts for the UE.

Aspect 22: The method of any of Aspects 19-21, further comprising: receiving, from the node, another indication of a power boosting value that is to be used for one or more transmissions to the node on one or more tones in the one or more frequency locations that are indicated to be avoided.

Aspect 23: A method of wireless communication performed by a node, comprising: receiving, from a user equipment (UE), a list of frequency allocations that are associated with interference at the UE; and communicating in accordance with the list of frequency allocations.

Aspect 24: The method of Aspect 23, wherein the node is a network entity or another UE.

Aspect 25: The method of any of Aspects 23-24, wherein frequency allocations, of the list of frequency allocations, are associated with at least one of: one or more spurs of the UE, or external interference at the UE.

Aspect 26: The method of any of Aspects 23-25, wherein the list of frequency allocations indicates a frequency allocation by a starting frequency and an ending frequency.

Aspect 27: The method of any of Aspects 23-26, wherein the list of frequency allocations is received in at least one of:

a radio resource control message, or a medium access control control element (MAC-CE).

Aspect 28: The method of any of Aspects 23-27, further comprising: receiving, from the UE, a message indicating one or more frequency allocations, of the list of frequency allocations, that are requested to be avoided for transmissions to the UE.

Aspect 29: The method of Aspect 28, wherein the message is a medium access control control element message.

Aspect 30: The method of any of Aspects 28-29, wherein the one or more frequency allocations that are requested to be avoided are based at least in part on at least one of: a configuration of one or more component carriers for the UE, or a configuration of one or more bandwidth parts for the UE.

Aspect 31: The method of any of Aspects 28-30, further comprising: transmitting, to the UE, an indication of whether the one or more frequency allocations are to be avoided for transmissions to the UE.

Aspect 32: The method of Aspect 31, wherein the indication is in a medium access control control element or in downlink control information.

Aspect 33: The method of any of Aspects 31-32, wherein the indication indicates an association between at least one frequency allocation, of the one or more frequency allocations, and at least one of: a particular component carrier configuration for the UE, or a particular bandwidth part configuration for the UE.

Aspect 34: The method of any of Aspects 31-33, further comprising: determining that at least one of: one or more transmissions to the UE are to avoid tones in the one or more frequency allocations that are indicated to be avoided, or additional power is to be used for one or more transmissions to the UE on one or more tones in the one or more frequency allocations that are indicated to be avoided.

Aspect 35: The method of any of Aspects 31-34, wherein communicating in accordance with the list of frequency allocations comprises: communicating based at least in part on a resource allocation, for one or more transmissions to the UE, that avoids tones in the one or more frequency allocations that are indicated to be avoided.

Aspect 36: The method of any of Aspects 31-35, further comprising: transmitting, to the UE, another indication of a power boosting value that is to be used for one or more transmissions to the UE on one or more tones in the one or more frequency allocations that are indicated to be avoided.

Aspect 37: The method of Aspect 36, wherein the other indication is in a medium access control control element or in downlink control information.

Aspect 38: The method of any of Aspects 31-37, wherein communicating in accordance with the list of frequency allocations comprises: transmitting, to the UE, one or more pilot signals in resources that avoid the one or more frequency allocations that are indicated to be avoided.

Aspect 39: The method of Aspect 38, wherein the resources are shifted relative to a pattern for the one or more pilot signals.

Aspect 40: The method of any of Aspects 23-39, further comprising: transmitting, to the UE, a list of frequency locations that are associated with spurs of the node.

Aspect 41: The method of Aspect 40, wherein the list of frequency locations is received via radio resource control signaling.

Aspect 42: The method of any of Aspects 40-41, further comprising: transmitting, to the UE, an indication of one or more frequency locations, of the list of frequency locations, that are to be avoided for transmissions to the node.

Aspect 43: The method of Aspect 42, wherein the indication is in a medium access control control element or in downlink control information.

Aspect 44: The method of any of Aspects 42-43, wherein the one or more frequency locations that are indicated to be avoided are based at least in part on at least one of: a configuration of one or more component carriers for the UE, or a configuration of one or more bandwidth parts for the UE.

Aspect 45: The method of any of Aspects 42-44, further comprising: transmitting, to the UE, another indication of a power boosting value that is to be used for one or more transmissions to the node on one or more tones in the one or more frequency locations that are indicated to be avoided.

Aspect 46: An apparatus for wireless communication at a device, comprising a processor; memory coupled with the processor; and instructions stored in the memory and executable by the processor to cause the apparatus to perform the method of one or more of Aspects 1-22.

Aspect 47: A device for wireless communication, comprising a memory and one or more processors coupled to the memory, the one or more processors configured to perform the method of one or more of Aspects 1-22.

Aspect 48: An apparatus for wireless communication, comprising at least one means for performing the method of one or more of Aspects 1-22.

Aspect 49: A non-transitory computer-readable medium storing code for wireless communication, the code comprising instructions executable by a processor to perform the method of one or more of Aspects 1-22.

Aspect 50: A non-transitory computer-readable medium storing a set of instructions for wireless communication, the set of instructions comprising one or more instructions that, when executed by one or more processors of a device, cause the device to perform the method of one or more of Aspects 1-22.

Aspect 51: An apparatus for wireless communication at a device, comprising a processor; memory coupled with the processor; and instructions stored in the memory and executable by the processor to cause the apparatus to perform the method of one or more of Aspects 23-45.

Aspect 52: A device for wireless communication, comprising a memory and one or more processors coupled to the memory, the one or more processors configured to perform the method of one or more of Aspects 23-45.

Aspect 53: An apparatus for wireless communication, comprising at least one means for performing the method of one or more of Aspects 23-45.

Aspect 54: A non-transitory computer-readable medium storing code for wireless communication, the code comprising instructions executable by a processor to perform the method of one or more of Aspects 23-45.

Aspect 55: A non-transitory computer-readable medium storing a set of instructions for wireless communication, the set of instructions comprising one or more instructions that, when executed by one or more processors of a device, cause the device to perform the method of one or more of Aspects 23-45.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
transmit, to a node, a list of frequency allocations that are associated with interference at the UE, wherein:
frequency allocations of the list of frequency allocations are indexed by an order in which the frequency allocations appear in the list of frequency allocations; and
each frequency allocation of the list of frequency allocations is associated with at least one of: one or more spurs of the UE, or external interference at the UE; and
communicate in accordance with the list of frequency allocations; and
receive, from the node, an indication of a power boosting value that is to be used for one or more transmissions to the UE on one or more tones in one or more frequency allocations that are indicated to be avoided.

2. The apparatus of claim 1, wherein the node is a network entity or another UE.

3. The apparatus of claim 1, wherein the one or more processors are further configured to:
transmit, to the node, a message indicating one or more frequency allocations, of the list of frequency allocations, that are requested to be avoided for transmissions to the UE.

4. The apparatus of claim 3, wherein the one or more processors are further configured to:
receive, from the node, an indication of whether the one or more frequency allocations, that are requested to be avoided for transmissions to the UE by the message, are to be avoided for transmissions to the UE.

5. The apparatus of claim 1, wherein the one or more processors, to communicate in accordance with the list of frequency allocations, are configured to:
communicate based at least in part on a resource allocation, for one or more transmissions to the UE, that avoids tones in the one or more frequency allocations that are indicated to be avoided.

6. The apparatus of claim 1, wherein the one or more processors, to communicate in accordance with the list of frequency allocations, are configured to:
receive, from the node, one or more pilot signals in resources that avoid the one or more frequency allocations that are indicated to be avoided.

7. The apparatus of claim 6, wherein the resources are shifted relative to a pattern for the one or more pilot signals.

8. The apparatus of claim 1, wherein the one or more processors are further configured to:
receive, from the node, a list of frequency locations that are associated with spurs of the node.

9. The apparatus of claim 1, wherein the one or more processors are further configured to:
receive, from the node, an indication of the one or more frequency locations, of the list of frequency locations, that are to be avoided for transmissions to the node.

10. An apparatus for wireless communication at a node, comprising:
one or more memories; and
one or more processors, coupled to the one or more memories, configured to:
receive, from a user equipment (UE), a list of frequency allocations that are associated with interference at the UE, wherein:
frequency allocations of the list of frequency allocations are indexed by an order in which the frequency allocations appear in the list of frequency allocations; and each frequency allocation of the list of frequency allocations is associated with at least one of: one or more spurs of the UE, or external interference at the UE; and communicate in accordance with the list of frequency allocations; and transmit, to the UE, an indication of a power boosting value that is to be used for one or more transmissions to the UE on one or more tones in one or more frequency allocations that are indicated to be avoided.

11. The apparatus of claim 10, wherein the node is a network entity or another UE.

12. The apparatus of claim 10, wherein the one or more processors are further configured to:

receive, from the UE, a message indicating one or more frequency allocations, of the list of frequency allocations, that are requested to be avoided for transmissions to the UE.

13. The apparatus of claim 12, wherein the one or more processors are further configured to:

transmit, to the UE, an indication of whether the one or more frequency allocations, that are requested to be avoided for transmissions to the UE by the message, are to be avoided for transmissions to the UE.

14. The apparatus of claim 10, wherein the one or more processors, to communicate in accordance with the list of frequency allocations, are configured to:

communicate based at least in part on a resource allocation, for one or more transmissions to the UE, that avoids tones in the one or more frequency allocations that are indicated to be avoided.

15. The apparatus of claim 10, wherein the one or more processors, to communicate in accordance with the list of frequency allocations, are configured to:

transmit, to the UE, one or more pilot signals in resources that avoid the one or more frequency allocations that are indicated to be avoided.

16. The apparatus of claim 15, wherein the resources are shifted relative to a pattern for the one or more pilot signals.

17. The apparatus of claim 10, wherein the one or more processors are further configured to:

transmit, to the UE, a list of frequency locations that are associated with spurs of the node.

18. The apparatus of claim 10, wherein the one or more processors are further configured to:

transmit, to the UE, an indication of the one or more frequency locations, of the list of frequency locations, that are to be avoided for transmissions to the node.

19. A method of wireless communication performed by a user equipment (UE), comprising:

transmitting, to a node, a list of frequency allocations that are associated with interference at the UE, wherein:

frequency allocations of the list of frequency allocations are indexed by an order in which the frequency allocations appear in the list of frequency allocations; and each frequency allocation of the list of frequency allocations is associated with at least one of: one or more spurs of the UE, or external interference at the UE; and communicating in accordance with the list of frequency allocations; and receiving, from the node, an indication of a power boosting value that is to be used for one or more transmissions to the UE on one or more tones in one or more frequency allocations that are indicated to be avoided.

20. The method of claim 19, further comprising:

transmitting, to the node, a message indicating one or more frequency allocations, of the list of frequency allocations, that are requested to be avoided for transmissions to the UE.

21. The method of claim 19, further comprising:

receiving, from the node, a list of frequency locations that are associated with spurs of the node.

22. A method of wireless communication performed by a node, comprising:

receiving, from a user equipment (UE), a list of frequency allocations that are associated with interference at the UE, wherein:

frequency allocations of the list of frequency allocations are indexed by an order in which the frequency allocations appear in the list of frequency allocations; and each frequency allocation of the list of frequency allocations is associated with at least one of: one or more spurs of the UE, or external interference at the UE; and communicating in accordance with the list of frequency allocations; and transmitting, to the UE, an indication of a power boosting value that is to be used for one or more transmissions to the UE on one or more tones in one or more frequency allocations that are indicated to be avoided.

23. The method of claim 22, further comprising:

receiving, from the UE, a message indicating one or more frequency allocations, of the list of frequency allocations, that are requested to be avoided for transmissions to the UE.

24. The method of claim 22, further comprising:

transmitting, to the UE, a list of frequency locations that are associated with spurs of the node.

25. The method of claim 19, wherein the node is a network entity or another UE.

26. The method of claim 22, wherein the node is a network entity or another UE.

* * * * *